US006223775B1

(12) United States Patent
Hansen et al.

(10) Patent No.: US 6,223,775 B1
(45) Date of Patent: May 1, 2001

(54) ACCUMULATOR

(76) Inventors: Craig N. Hansen; Paul C. Cross, both of 14920 Minnetonka Industrial Rd., Minnetonka, MN (US) 55345

( * ) Notice: Subject to any disclaimer, the term of this patent is extended or adjusted under 35 U.S.C. 154(b) by 0 days.

(21) Appl. No.: 09/523,930

(22) Filed: Mar. 13, 2000

Related U.S. Application Data

(62) Division of application No. 09/118,625, filed on Jul. 17, 1998, now Pat. No. 6,138,646.

(60) Provisional application No. 60/053,148, filed on Jul. 18, 1997.

(51) Int. Cl.[7] .................... F16L 55/04

(52) U.S. Cl. .................... 138/30; 138/26; 138/32; 123/447

(58) Field of Search .................... 138/26, 30, 32; 123/559.1, 447

(56) References Cited

U.S. PATENT DOCUMENTS

| | | | |
|---|---|---|---|
| 1,120,828 | 12/1914 | Lowry . | |
| 1,325,266 | 12/1919 | Smith . | |
| 1,846,656 | 2/1932 | Rayfield . | |
| 2,563,257 * | 8/1951 | Loukonen . | |
| 2,754,289 * | 7/1956 | Meyer | 138/30 |
| 3,020,901 | 2/1962 | Cook . | |
| 3,493,001 * | 2/1970 | Bevandich | 138/30 |
| 3,593,747 * | 7/1971 | Mercier | 138/30 |
| 3,669,150 * | 6/1972 | Everett | 138/26 |
| 3,963,052 * | 6/1976 | Mercier | 138/30 |
| 4,201,246 * | 5/1980 | Wirth et al. | 138/30 |
| 4,321,949 * | 3/1982 | Mercier | 138/30 |
| 4,562,036 * | 12/1985 | Shin et al. | 138/30 |
| 4,836,409 * | 6/1989 | Lane | 138/30 |
| 4,884,534 | 12/1989 | Moore . | |
| 5,655,569 * | 8/1997 | Tackett | 138/30 |
| 5,971,027 * | 10/1999 | Beachley et al. | 138/30 |
| 6,138,646 * | 10/2000 | Hansen et al. | 123/559.1 |

FOREIGN PATENT DOCUMENTS 619576 4/1927 (FR) .

* cited by examiner

*Primary Examiner*—James Hook

(57) ABSTRACT

A pump for moving a fluid has a housing with a internal chamber accommodating a pair of rotating pistons. Each piston has protrusions that register with pockets in the other piston in non-contact relation as the pistons rotate. A fluid accumulator in fluid communication with the pump holds a supply of fluid to prevent excessive pressure rise.

12 Claims, 16 Drawing Sheets

ACCUMULATOR

CROSS REFERENCE TO RELATED APPLICATION

This application is a division of U.S. application Ser. No. 09/118,625 filed Jul. 17, 1998 now U.S. Pat. No. 6,138,646. Application Ser. No. 09/118,625 claims the priority date of U.S. Provisional Application Ser. No. 60/053,148 filed Jul. 18, 1997.

FIELD OF THE INVENTION

The invention relates to fluid pumps, such as blowers and superchargers for internal combustion engines, and other processes requiring large volumes of fluid at relatively low pressure.

BACKGROUND OF THE INVENTION

In an internal combustion engine a boost in horsepower can be accomplished by forcing a more dense air/fuel charge into the cylinders with a supercharger. A supercharger can provide a dependable and affordable method of increasing horsepower and torque. A supercharger forces a more dense air/fuel mixture into an internal combustion engine's cylinders than the engine can draw in under normal conditions. This higher-energy mixture produces more power. Supercharging increases the engine's volumetric flow without increasing its displacement. Therefore, a supercharged small engine can produce the horsepower and torque of a relatively larger engine.

There are two basic blower systems used to force an air/fuel mixture into an internal combustion engine. These blowers are either a dynamic or a positive displacement equipment. Turbocharging, which is a dynamic process, places a turbine wheel in the exhaust flow of the engine. The turbine blades are directly connected to a centrifugal blower. One major disadvantage of a turbocharger is "turbo-lag." This is the delay that occurs after calling for power with the throttle before the rotational speed of the system spools up to deliver that power. An improperly sized or designed turbo system can rapidly over-boost and damage a spark-ignited internal combustion engine. The sizing of the turbocharger to the engine and the matching of the turbine size and design to impeller size and design are very critical. Additionally, the exhaust turbine tends to cool the exhaust gases thereby delaying the catalyst light-off of modern automotive emissions systems.

Turbine-type supercharging is a system having a drive belt from the crankshaft. A speed-increaser, either geared or gearless, is required to multiply the speed of the turbine impeller relative to that of the input shaft. The delivery of a turbine-type device varies dramatically with its rotational speed, and is prone to under-boost at low speed and over-boost at high speed. An example of a centrifugal supercharger is disclosed by M. Shirai in U.S. Pat. No. 5,158,427.

The most common positive displacement system is the "Roots blower". In this system, a belt-driven shaft drives two close-clearance rotors which are geared together. Each full rotation sweeps out a specific fixed volume, unlike the fan-like characteristics of a turbine device.

SUMMARY OF THE INVENTION

The invention is a fluid pump used as a supercharger to provide an air/fuel mixture to an internal combustion engine in an efficient and reliable manner for sharply increasing the torque and corresponding horsepower of the engine across its entire operating speed range. The supercharger has simple geometric shaped structures which are easy to fabricate at a relatively low cost. The supercharger employs a pair of cooperating rotors that do not have complex curved surfaces which require relatively costly NC profile milling or dedicated machine tool operations. Conventional materials such as aluminum, cast iron or plastics and established fabrication procedures are used to manufacture the supercharger.

The supercharger rotors have clearances relative to their cooperating or mating surfaces and housing surfaces that accommodate deflection. The cylindrical shapes of the rotors and inside surfaces of the housing allow for predictable and repeatable clearances between non-contacting mating parts. This reduces leakage which improves efficiency while maintaining low cost manufacturing procedures. The cylindrical shapes of the supercharger rotors and associated surfaces are inherently rigid and not prone to flexing and twisting when subjected to pressures and inertial loads.

The supercharger has a housing with two generally cylindrical chambers open to each other and fluid inlet and outlet ports. A rotor assembly located in the chambers operates to draw fluid, such as an air/fuel mixture, into the chambers and discharge the fluid out the outlet port and into the intake of an internal combustion engine. The rotor assembly has a pair of rotors mounted on shafts rotatably supported on the housing. Each rotor has semi-cylindrical pockets and semi-cylindrical protrusions that cooperate with the pockets of the adjacent rotor to move fluid through the supercharger when the rotors are rotated. The protrusions on each rotor do not contact the inside cylindrical surfaces of the housing. Also, the protrusions on each rotor do not contact the cooperating rotor as they move into and out of the mating pockets. This allows for both high speed and oil free operation. Furthermore, the protrusions can be integral portions of the rotor or may alternatively be separately manufactured pieces that can then be assembled to the rotor body. The protrusions are located in the semi-cylindrical pockets of the adjacent rotor generally half of the time during rotation of the rotors. Therefore, the pressure fluctuations and associated noise and heat are reduced. There is minimal trapped volume of fluid in the pockets. This reduces one of the common sources of noise, heat, and vibrations among prior devices. Additionally, the fluid inlet has two passages. This improves volumetric efficiency and reduces churning of the fluid and heating of the inlet region of the rotor.

To maximize performance in one or two cylinder engines, an accumulator is situated between the supercharger and the engine inlet. The accumulator moderates the pressure variations in the intermediate manifold when the engine cylinder is not in the intake phase. In the case where a liquid fuel is introduced up stream of the accumulator site, the accumulator employs a generally conic shape to avoid collection or pooling of liquid fuel in the accumulator chamber. When the engine equipped with the supercharger and accumulator is used to power a vehicle, such as a go-kart, the cone shaped accumulator allows vehicle acceleration and high speed cornering without fuel pooling in the accumulator. A preferred location for the accumulator is adjacent to and slightly above the engine inlet port. The supercharger may be employed in multi-cylinder engines of three cylinders or greater without the need for the accumulator.

DESCRIPTION OF THE PREFERRED EMBODIMENTS

Figure 1:
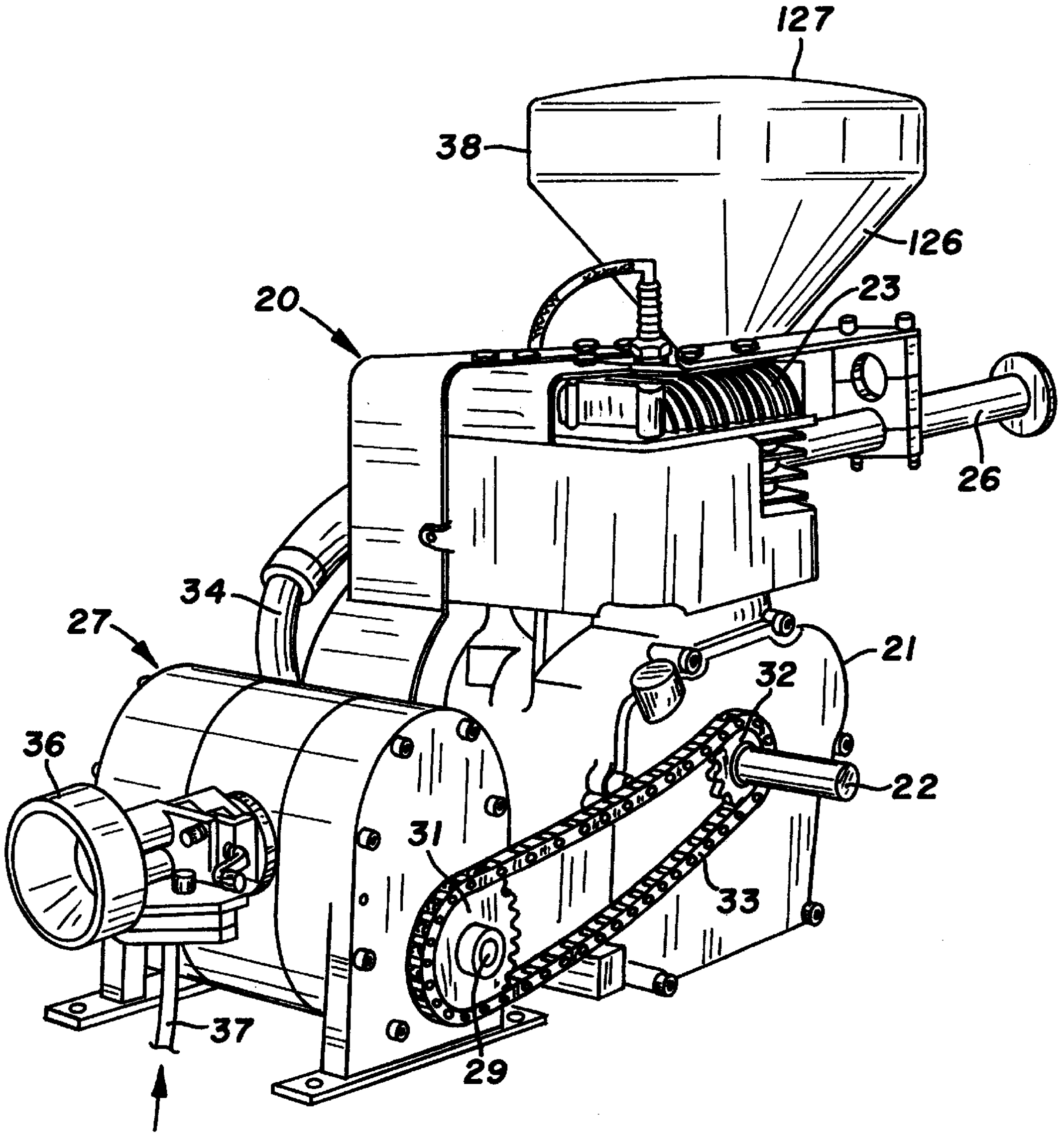
FIG. 1 is a perspective view of a single cylinder internal combustion engine combined with a supercharger and accumulator of the invention.
Figure 2:
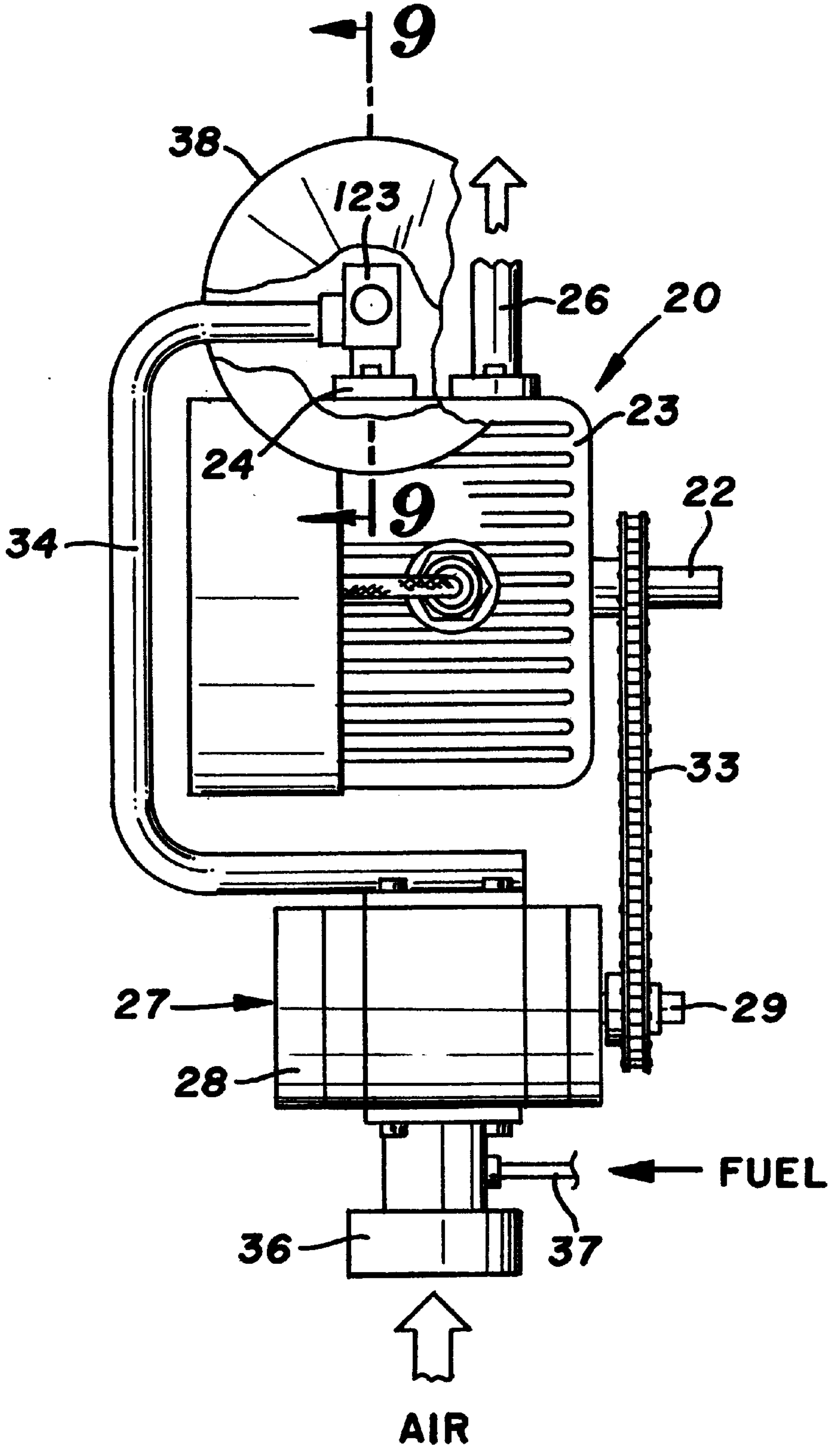
FIG. 2 is a diagrammatic view of the engine, supercharger and accumulator of FIG. 1.

The supercharging system of the invention is used with an internal combustion engine 20 to increase the engine's volumetric efficiency and output horsepower. As shown in FIGS. 1 and 2, engine 20 has a crank case 21 rotatably supporting a power output shaft 22. A head 23 mounted on top of case 21 is attached to a fuel intake pipe or manifold 24 and an exhaust pipe 26. Engine 20 is a single cylinder four cycle conventional air cooled internal combustion engine. An example of engine 20 is a five horsepower, single cylinder, four cycle internal combustion engine. Other types of internal combustion engines including two cylinder models are adaptable to the supercharging pump and accumulator system of the invention. Additionally, the pump may be used without the accumulator on engines of three or more cylinders.

Engine 20 is supplied with an air/fuel mixture with a supercharger or fluid pump 27. Supercharger 27 has a housing 28 rotatably supporting a drive shaft 29. A power transmission comprising a first sprocket 31 on shaft 29, a second sprocket 32 on shaft 22, and an endless roller link chain 33 coupling sprockets 31 and 32 provides a direct drive between engine 20 and supercharger 27. Sprockets 31 and 32 have a diameter whereby the RPM of engine 20 is the substantially the same as the operating speed of supercharger 27. Sprockets 31 and 32 can have a sprocket ratio to provide desired air flow to a specific engine size. Supercharger 27 is a positive displacement fluid pump operable to deliver a supply of air/fuel mixture to engine 20 to increase its adiabatic efficiency and horsepower. The air/fuel mixture flows through a pipe or tubular member 34 connected to supercharger 27 and intake pipe 24 of engine 20.

An air/fuel mixing device 36, known as a carburetor, mounted on housing 28 operates to introduce fuel, such as gasoline and alcohol, into air flowing through device 36 to provide an air/fuel mixture for engine 20. A fuel line 37 connected to device 36 carries liquid fuel from a tank (not shown) to device 36.

Figure 9:
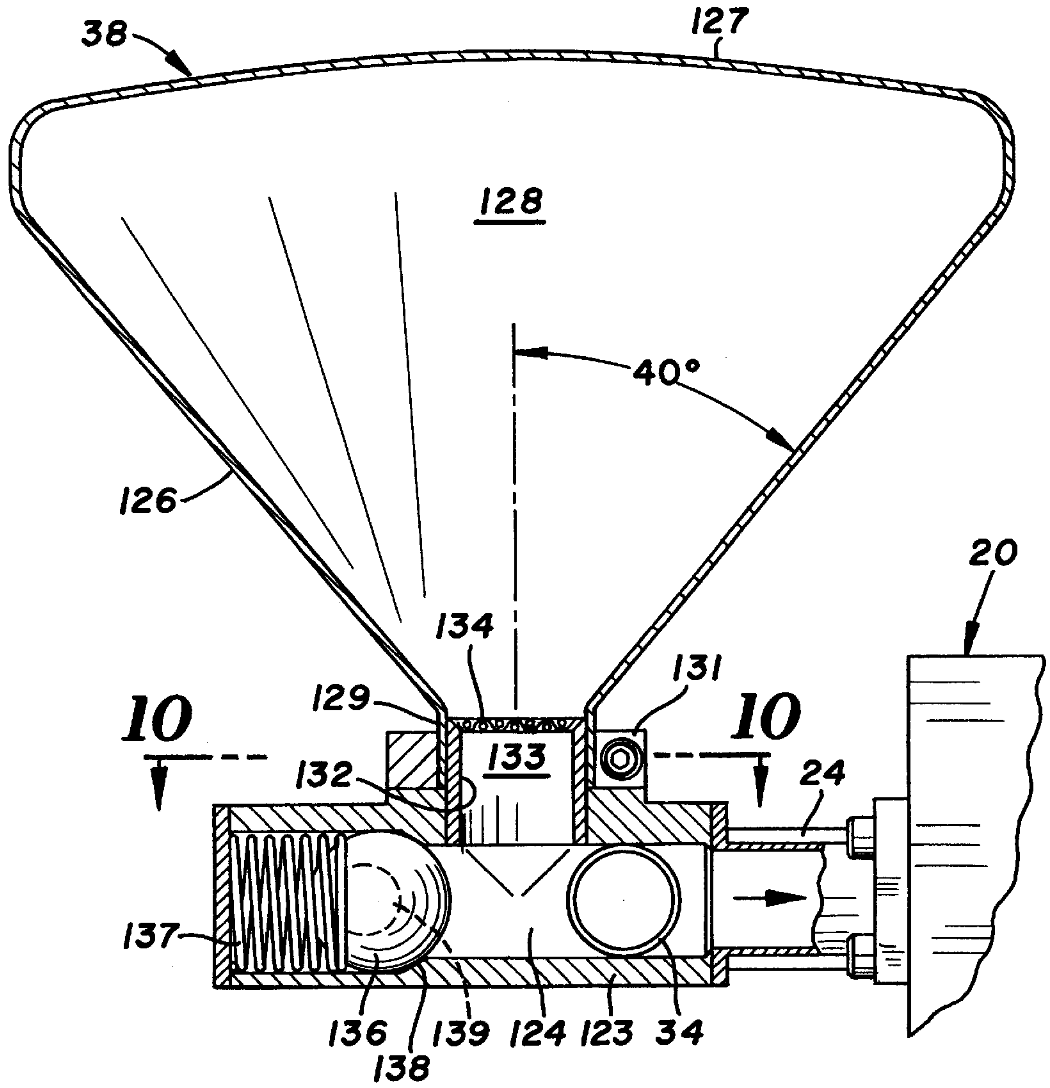
FIG. 9 is an enlarged sectional view taken along line 9—9 of FIG. 2.
Figure 11:
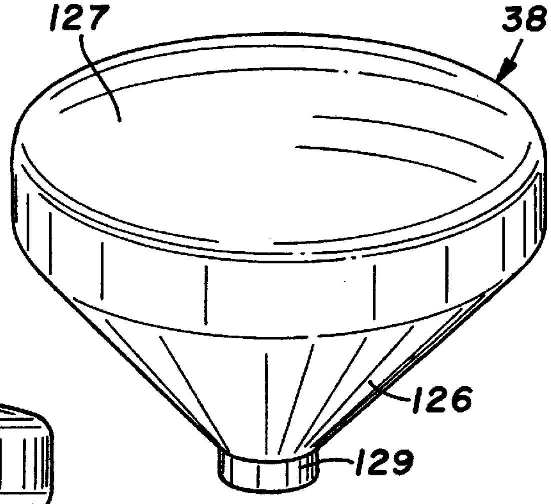
FIG. 11 is a perspective view of the air/fuel accumulator.
Figure 12:
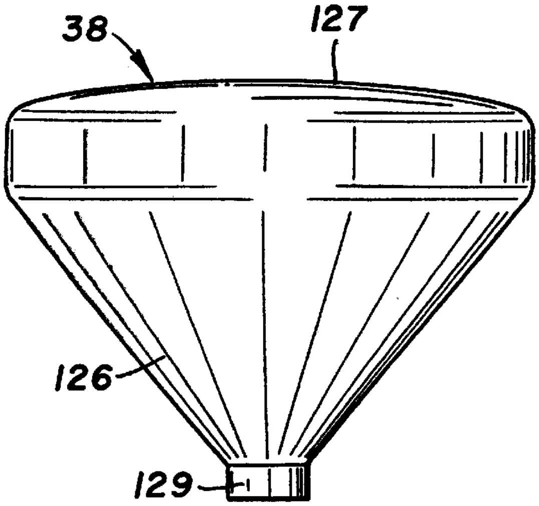
FIG. 12 is a side elevational view of the accumulator of FIG. 11.
Figure 13:
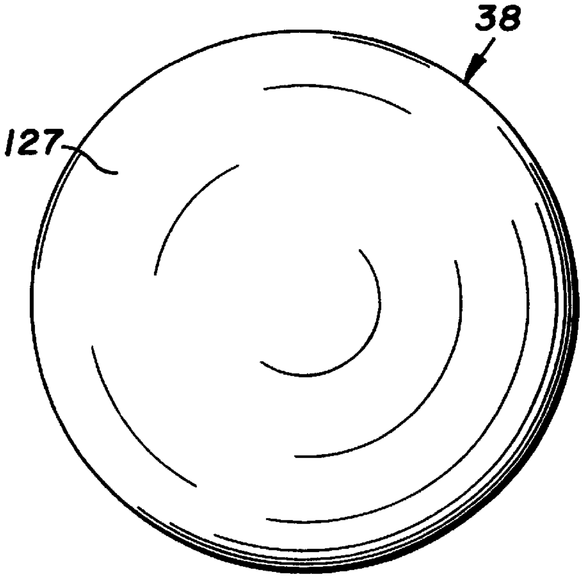
FIG. 13 is a top plan view of the accumulator of FIG. 11.
Figure 14:
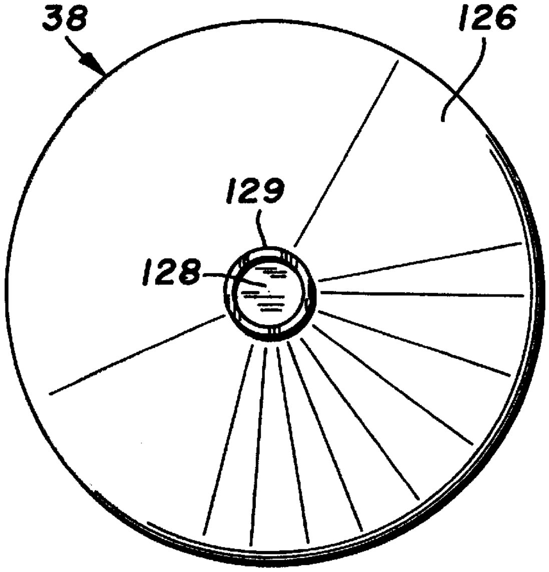
FIG. 14 is a bottom plan view of the accumulator of FIG. 11.

An air/fuel mixture accumulator 38 is in fluid communication with pipe 34 to hold a supply of an air/fuel mixture between the engine intake strokes without excessive pressure rise. For example, for a single cylinder engine the volume of accumulator 38 is about twelve times the engine displacement. As shown in FIGS. 1, 9 and 11, accumulator 38 has a funnel or cone shape which allows a vehicle driven with engine 20 to accelerate and corner without pooling of fuel in accumulator 38. Further, it must be emphasized that supercharger 27 may be employed in multi-cylinder engines of three cylinders or greater without the need for accumulator 38.

Figure 3:
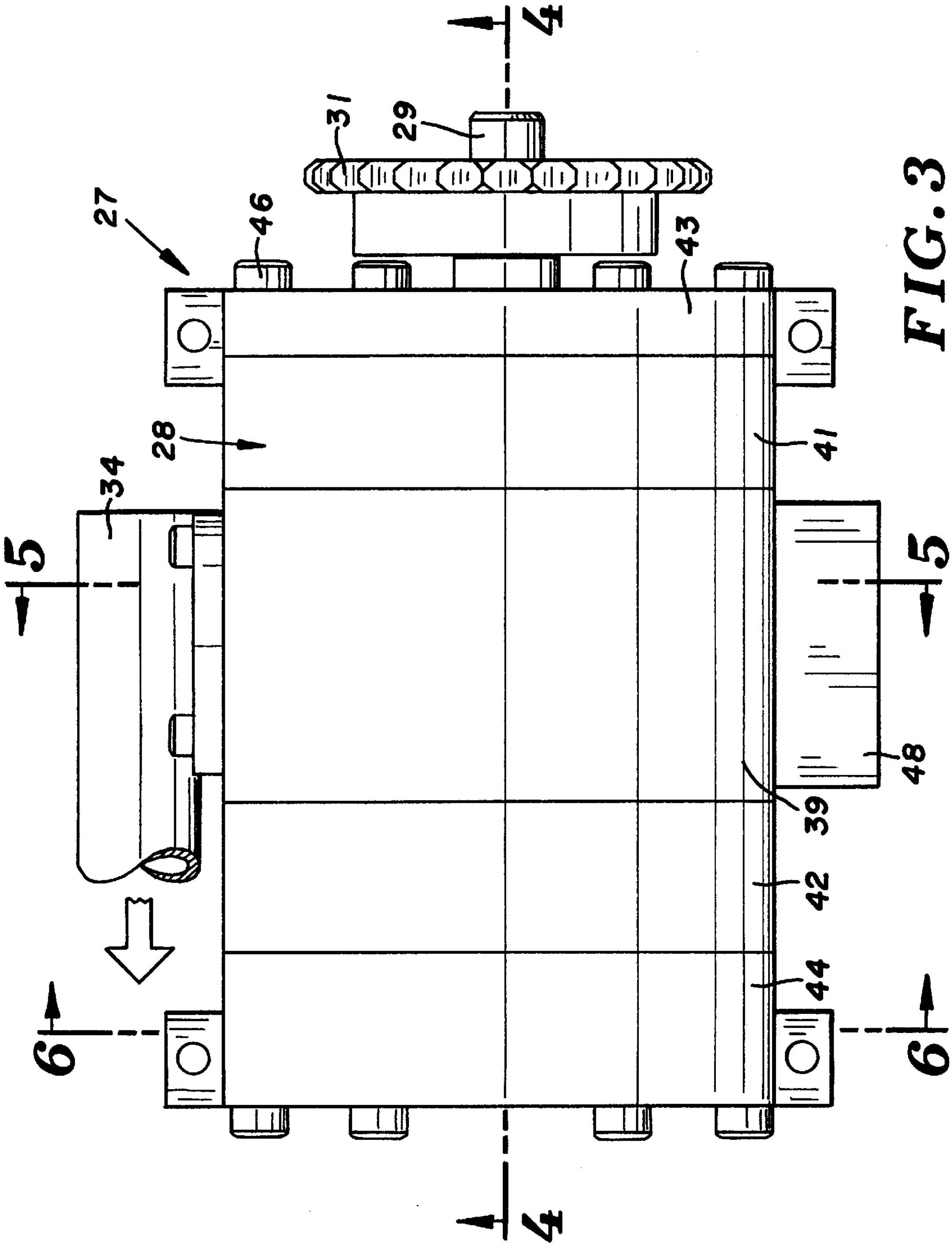
FIG. 3 is an enlarged top plan view of the supercharger of FIG. 1.
Figure 4:
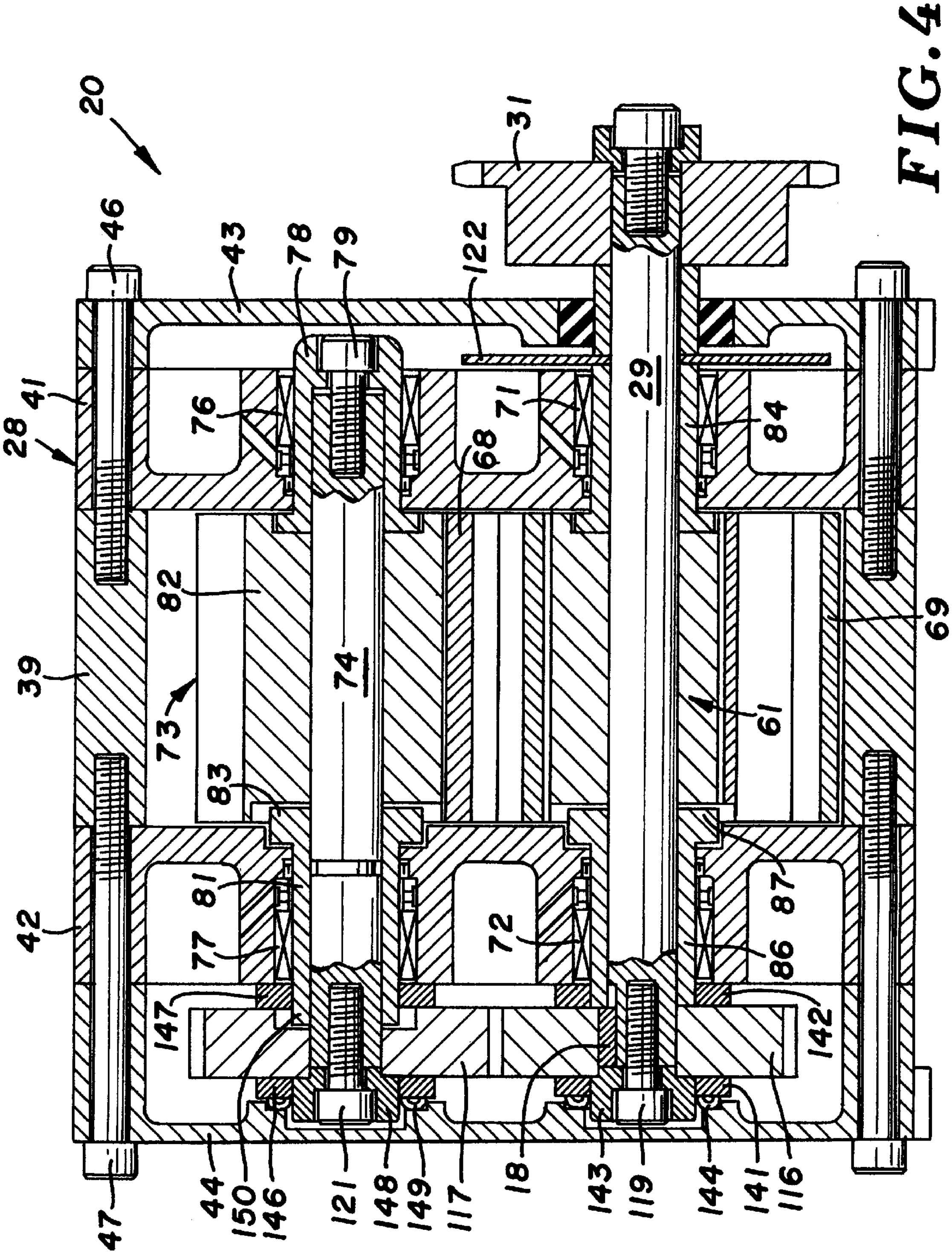
FIG. 4 is a sectional view taken along line 4—4 of FIG. 3.

Supercharger housing 28, shown in FIGS. 3 and 4, has a central body 39 located between end members 41 and 42. A first cover plate 43 is located adjacent to the outside of end member 41. A plurality of bolts 46 attach end member 41 and cover plate 43 to body 39. A second cover plate 44 closes the outside of end member 42. A plurality of bolts 47 secure end member 42 and cover plate 44 to body 39. An annular boss 48 secured to body 39 with bolts 49 has a passage 51 open to a pair of passages 52 and 53 in body 39 to carry the air/fuel mixture from device 36 to the interior of body 39.

Body 39 has a first arcuate inside wall 54 surrounding a first chamber 56 and a second arcuate inside wall 57 surrounding chamber 58. Passage 52 is open to chamber 56 to allow the air/fuel mixture to flow in a tangential direction into chamber 56. Passage 53 is open to chamber 58 so that the air/fuel mixture flows in a tangential direction into chamber 58. Walls 54 and 57 have cylindrical surfaces which are machined with conventional machine tools. Body 39 has a central portion 59 separating passages 52 and 53. Opposite portion 59 is an air/fuel discharge port 60 for carrying the air/fuel mixture from chambers 56 and 58 to pipe 34 leading to engine intake and accumulator 38.

Figure 5:
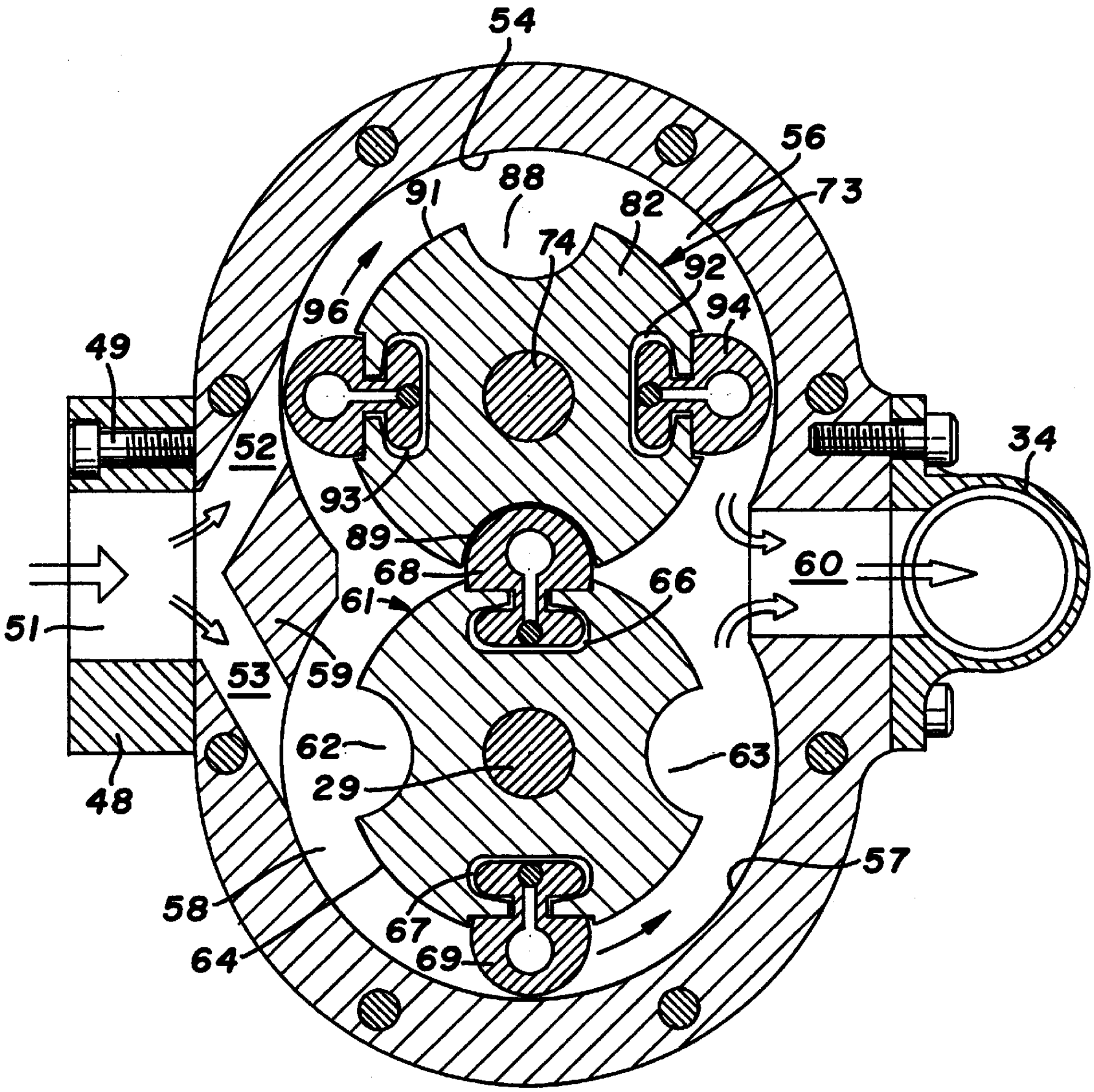
FIG. 5 is a sectional view taken along line 5—5 of FIG. 3.
Figure 8:
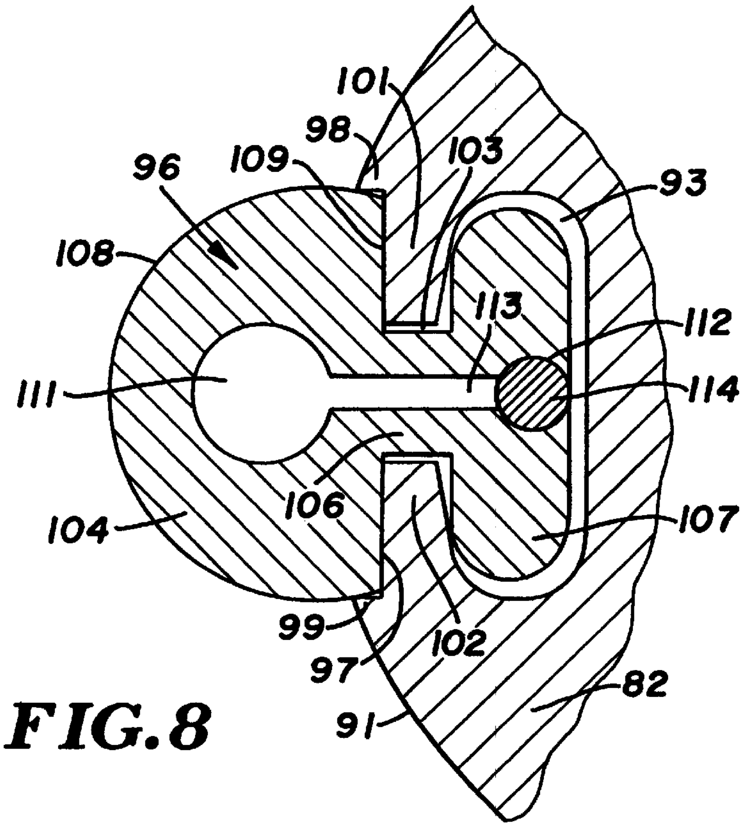
FIG. 8 is a sectional view taken along line 8—8 of FIG. 7.

As shown in FIG. 5, a first rotor or rotating piston 61 mounted on shaft 29 is located in chamber 58. Rotor 61 has a pair of pockets or recesses 62 and 63 open to its cylindrical outer surface 64. Body surface 57 is concentric with rotor external surface 64. Surface 64 concentric with shaft 29 comprise segments of a cylinder pitch circle. Pockets 62 and 63 have semi-circular cross sections and semi-cylindrical surfaces. Pockets 62 and 63 are on opposite sides of rotor 61 and ninety degrees or normal to key slots 66 and 67 in opposite portions of rotor 61. A first protrusion 68 extended into key slot 66 is wedged into a tight-fit relationship with rotor 61. A second protrusion 69 is anchored in key slot 67. The outer apex portions of protrusions 68 and 69 are located in close non-contacting relationship with body surface 57. The details of the anchor structure to retain protrusions 68 and 69 on rotor 61 are shown in FIG. 8.

A second rotor or rotary piston 73 is mounted on a shaft 74. Opposite ends of shaft 74 are rotatably mounted on end members 41 and 42 with bearings 76 and 77. A sleeve 78 secured to shaft 74 with a bolt 79 supports shaft 74 on bearing 76. A second sleeve 81 surrounding the opposite end of shaft 74 is keyed to rotor body 82 with a tongue and groove coupling 83. Sleeve 81 extends through bearing 77 whereby bearing 77 supports shaft 74 on end member 42.

Shaft 29 extends through sleeves 84 and 86 located adjacent opposite ends of body 61. Sleeve 84 extends through bearing 71 to support shaft 29 on end member 41. Sleeve 86 extends through bearing 72 to support shaft 29 on end member 42. A tongue and groove connection 87 drivably joins sleeve 86 to body 61 so that body 61 rotates with shaft 29.

Returning to FIG. 5, rotor body 82 has a pair of semi-cylindrical pockets 88 and 89 open to the outer cylindrical surface 91. Surface 91 is concentric with body surface 59. Surface 91 concentric with shaft 29 comprise segments of a cylinder pitch circle. The adjacent portions of surfaces 64 and 91 move in contiguous relationship as there is a small clearance between the adjacent surfaces. An example of this clearance is 0.005 to 0.007 inch. The rotor-to-rotor clearance reduces noise, wear of the rotors, and reduces heat generation. Pockets 88 and 89 are on opposite portions of body 82 and ninety degrees from key slots 92 and 93. Protrusions 94 and 96 are anchored in slots 92 and 93. The outer apex portions of protrusions 94 and 96 are in close non-contacting relation with body surfaces 54. Other insert-type protrusion attachment shapes may be used with the supercharging system of the invention. Alternatively, protrusions 94 and 96 can be integral portions of a monolithic rotor body. The number and locations of pockets and protrusions can vary to maintain dynamic balance of rotors 61 and 73.

Figure 7:
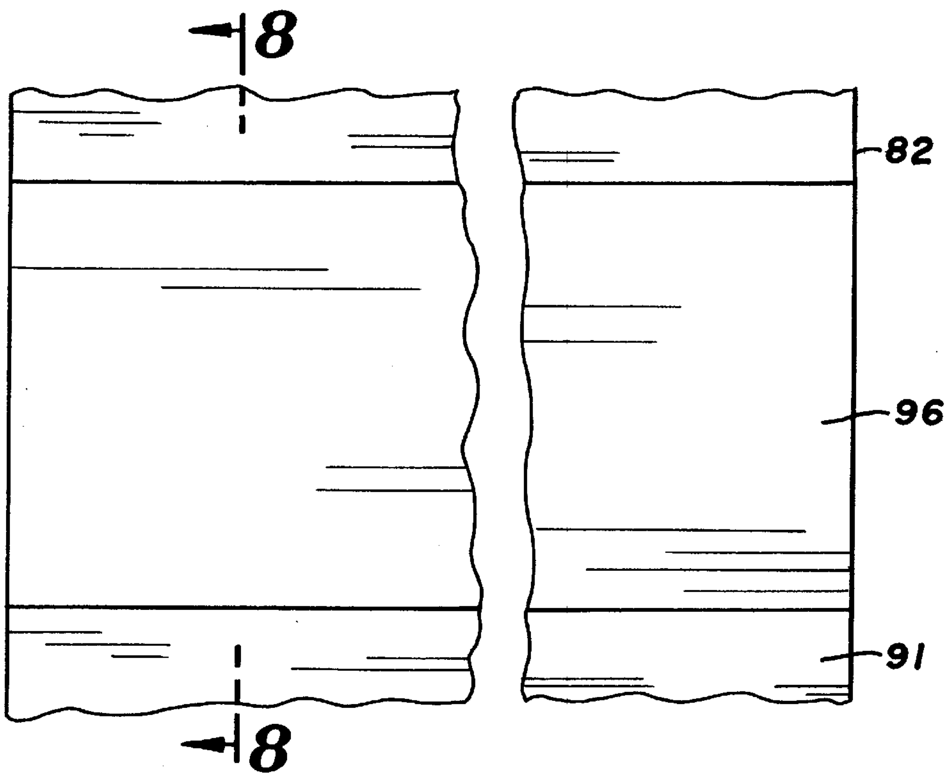
FIG. 7 is an enlarged foreshortened plan view of a protrusion mounted on a rotor of the supercharger.

As shown in FIGS. 7 and 8, body 82 has a longitudinal recess 97 and outwardly directed lips 98 and 99 at opposite sides of recess 97. The bottom of recess 97 is flat surfaces of body projections or members 101 and 102. Projections 101 and 102 are spaced from each other providing a longitudinal opening 103 to slot 93 and recess 97. Protrusion 96 has a generally semi-cylindrical body 104 joined to neck 106 connected to a head 107. Body 104 has a semi-cylindrical outer surface 108 and a flat inside surface or base 109. Surface 108 has a radius smaller than the radius of pocket 62 to minimize trapping of air between protrusion 96 and rotor pocket 62. Opposite portions of surface 108 are located against lips 98 and 99 with inside surface 109 bearing against adjacent projection surfaces. Neck 106 extends through opening 103 locating head 107 in recess 93. Head 107 extends adjacent the tapered inside faces of projections 101 and 102. Protrusion 96 has a cylindrical hole 111 in body 104, a cylindrical hole 112 in head 107 and a slot 113 in neck 106 connecting holes 111 and 112. A pin 114 located in hole 112 expands neck 106 and head 107 to firmly retain protrusion 96 on projections 101 and 102. Lips 98 and 99 prevent circumferential movements of protrusion 96 on body 82. Projections 101 and 102 prevent rocking of protrusion 96 on body 82. Protrusion 96 is an extruded metal part which is assembled longitudinally into recess 97, opening 103, and slot 93. Protrusion 96 can also be an integral portion of rotor body 82. Pin 114 is moved into hole 112 to retain protrusion 96 in a fixed position on rotor body 82. Protrusions 68, 69 and 94 are retained on rotors 61 and 73 in the same manner as shown in FIG. 8.

Figure 6:
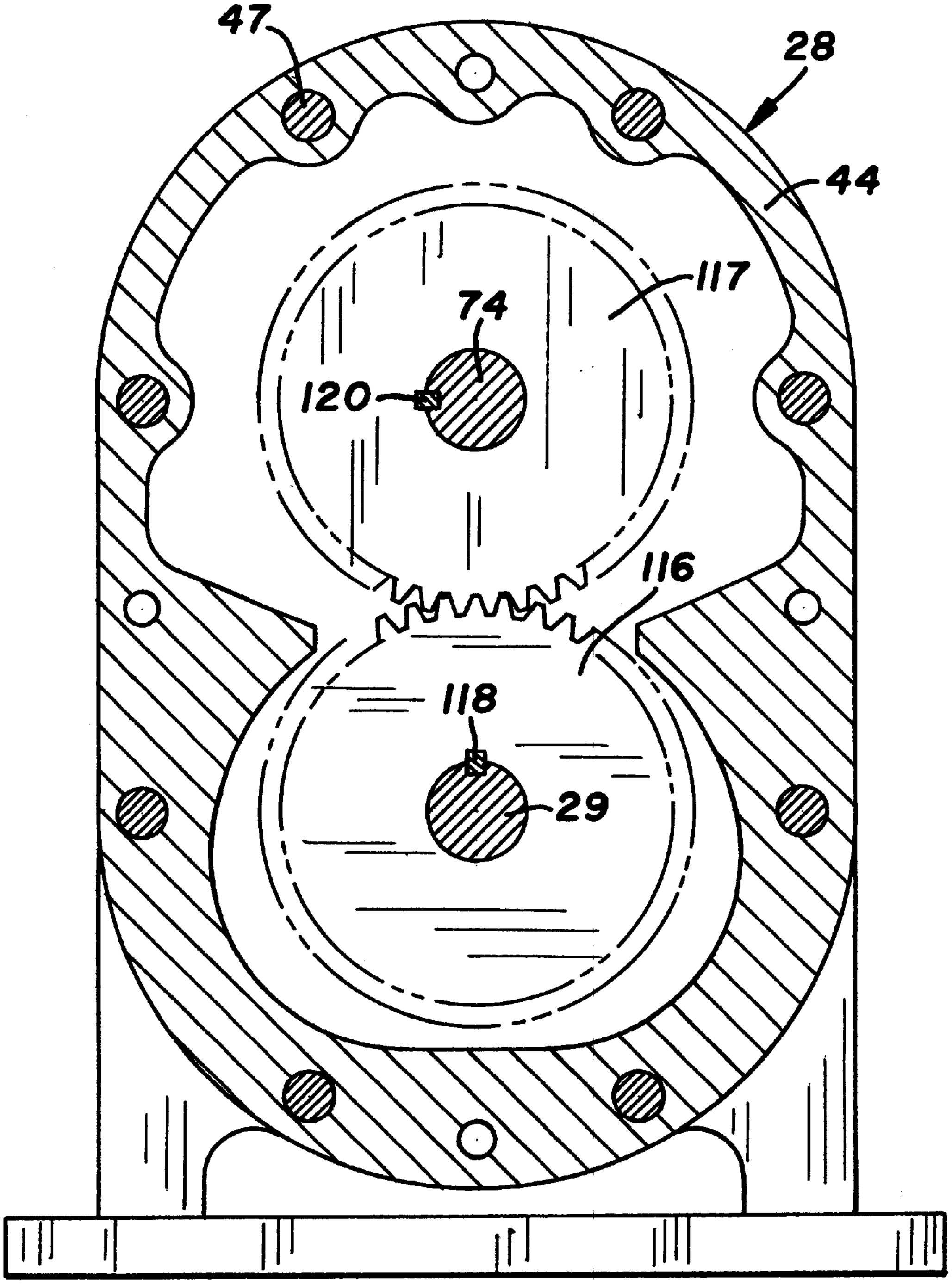
FIG. 6 is a sectional view taken along line 6—6 of FIG. 3.

As shown in FIGS. 4 and 6, shafts 29 and 74 are drivably connected with spur gears 116 and 117 located within end cover 44. Gear 116 is fixed to shaft 29 with a key 118 and bolt 119. Gear 116 is located between thrust bearing washers 141 and 142. Washer 141 fits around an annular head 143 accommodating the head of bolt 119. Washer 142 surrounds sleeve 86. Washers 141 and 142 engage opposite sides of gear 116. An annular spring 144, such as a wave-type spring, located in a shallow recess in cover plate 44 engages washer 141 and biases the thrust bearing washers axially to retain washer 142 against end member 42. This locates the axial positions of the gear 116 and rotor 61. As shown in FIG. 4, the flat ends of rotor 61 are spaced a small distance from adjacent inside surfaces of end members 41 and 42. The small clearance between rotor 61 and end members 41 and 42 reduces wear, friction and heat generation during rotation of rotor 61. A bolt 121 threaded into an end of shaft 74 secures gear 117 to shaft 74. A key 120 interconnects gear 117 with shaft 74 whereby gear 117 rotates shaft 74 and rotor 73. Bolt 121 retains gear 117 between thrust bearing washers 146 and 147. Washer 146 fits on a head 148 accommodating bolt 121. Washer 147 surrounds sleeve 81. A spring 149, such as an annular wave-like spring, located in a recess in cover plate 44 biases washer 146 to retain washer 147 against end member 42 to maintain the axial location of shaft 74, gear 117 and rotor 73. Rotor 73 has flat ends spaced a small distance from adjacent surfaces of end plates 41 and 42. The small clearance, seen in FIG. 4, between rotor body 82 and inside surfaces of end plates 41 and 42 reduces wear, friction and heat generation during rotation of rotor 73. Gears 116 and 117 have the same pitch diameters whereby shafts 29 and 74 rotate at the same speed. The pitch diameters of gears 116 and 117 are the same as the diameters of rotors 61 and 73. Rotors 61 and 73 turn in opposite directions at the same speed so that protrusions 68 and 69 register with pockets 88 and 89 in non-contact relation and protrusions 94 and 96 register with pockets 62 and 63 in non-contact relation during concurrent rotation of rotors 61 and 73. This reduces wear of the protrusions and rotor pockets and minimizes noise.

As shown in FIG. 4, cover plate 43 closes the open side of end member 41 and bearings 71 and 76. A flat disk 122 located between cover plate 43 and end member 41 is mounted on shaft 29. Disk 122 on rotation of shaft 29 moves a lubricant, such as oil, upward to lubricate bearings 71 and 76.

Figure 10:
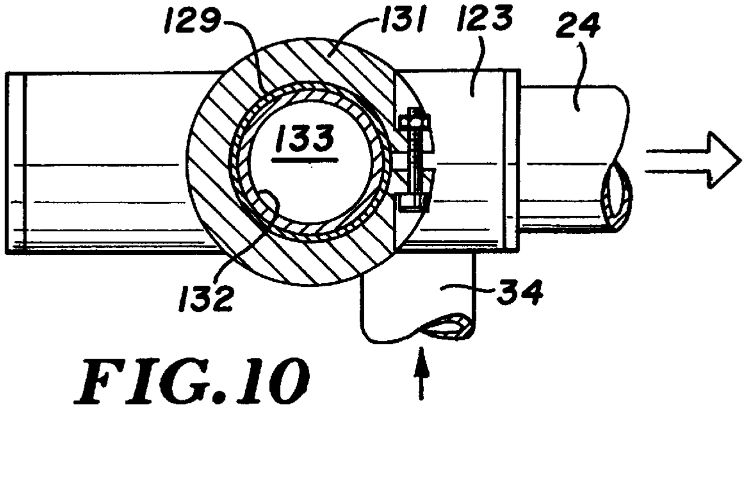
FIG. 10 is a sectional view taken along line 10—10 of FIG. 9.

As shown in FIGS. 9 and 10, a T-connector 123 is mounted on intake pipe 24. Hose 34 is joined to the side of connector 123 to direct the air/fuel mixture into a passage 124 of connector 123. The air/fuel mixture only flows into the combustion chamber of the engine on the intake cycle. The air/fuel mixture flows into the accumulator 38 during the remaining cycle of the engine. Accumulator 38 has a cone or funnel shaped side wall 126 and a dome top wall 129 surrounding a chamber 128. As seen in FIG. 9, side wall 126 extends downwardly from the outer edge of dome 129 at an angle of 40 degrees from the vertical axis of accumulator 38. Accumulator 38 moderates the pressure variations in the air/fuel intake manifold or passage to engine 20. The cone shape of wall 126 avoids collection or pooling of liquid fuel in accumulator chamber 128 as the fuel flows down wall 126 to passage 133. The ratio of air/fuel mixture is maintained as liquid fuel is not collected in accumulator chamber 128. Side wall 126 is joined to a downwardly directed neck or cylindrical end 129. A clamp 131 secures end 129 to a sleeve 132 having a passage 133 open to passage 124 and chambers 128. Screen 134 extends across passage 133 to reduce burning of the air/fuel mixture in chamber 128 in the event that the engine backfires.

Excessive pressure in passage 124 and chamber 128 is relieved with a check valve comprising a ball 136 biased with a spring 137 against an annular shoulder 138. When ball 136 is moved away from shoulder 138, the air/fuel mixture flows to atmosphere through a side port 139 in connector 123 or is piped back to the inlet of supercharger 27. Other types of pressure relief valves can be used to vent excessive pressure of the air/fuel mixture in accumulator chamber 128.

Figure 15:
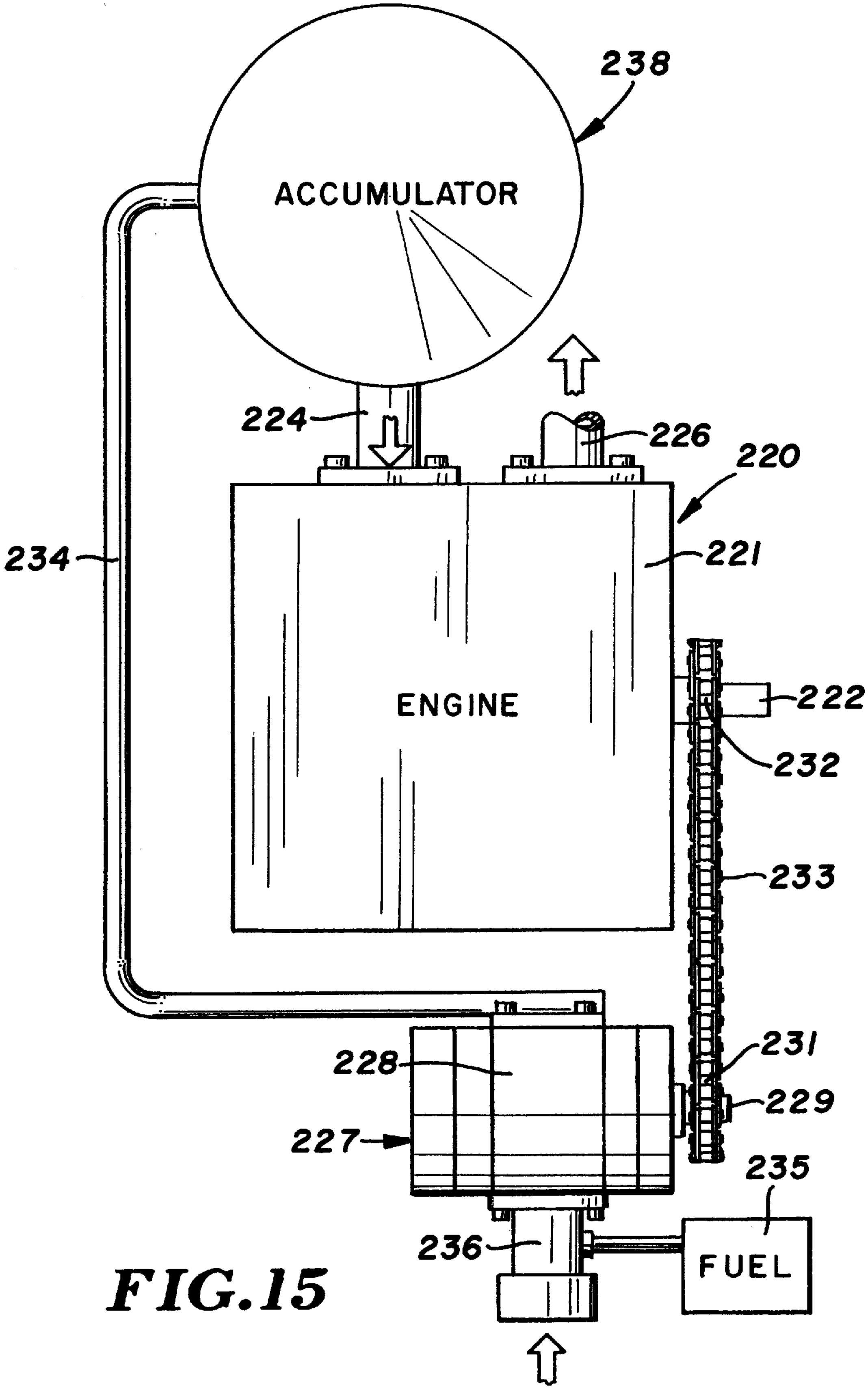
FIG. 15 is a diagrammatic view of an internal combustion engine operatively connected to a modification of the supercharger and accumulator of the invention.
Figure 16:
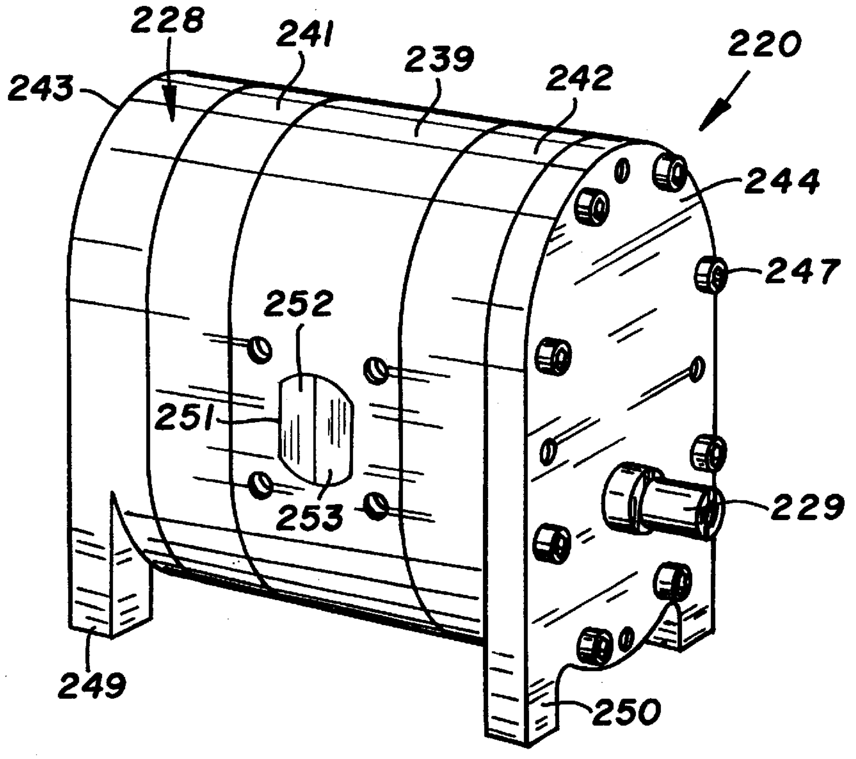
FIG. 16 is a perspective view of the supercharger of FIG. 15.
Figure 17:
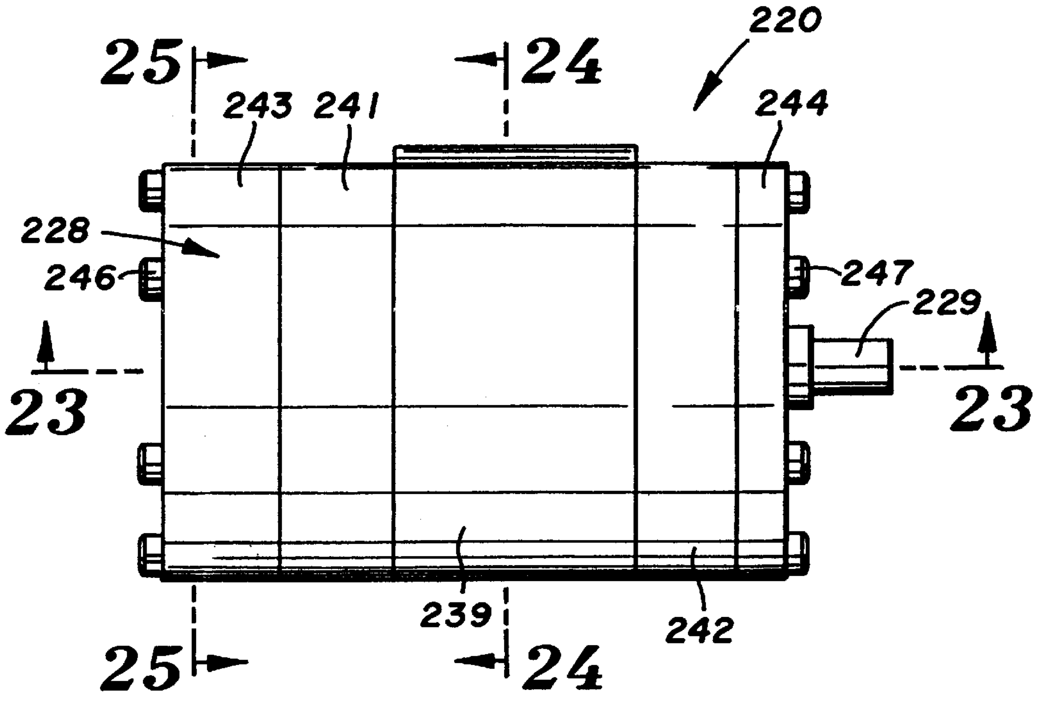
FIG. 17 is a top plan view of the supercharger of FIG. 16.

A modification of the supercharging system of the invention, shown in FIGS. 15 to 25, is used with an internal combustion engine 220 to increase the engine's volumetric efficiency and output horsepower. As shown in FIG. 15, engine 220 has a crank case 221 rotatably supporting a power output shaft 222. A fuel intake pipe or manifold 224 directs an air/fuel mixture to engine 220. An exhaust pipe 226 carries exhaust gas away from engine 220. Engine 220 is a single cylinder four cycle conventional air cooled internal combustion engine. An example of engine 220 is a five horsepower, single cylinder, four cycle internal combustion engine. Other types of internal combustion engines including two cylinder models are adaptable to the supercharging pump and accumulator system of the invention. Additionally, the pump may be used without the accumulator on engines of three or more cylinders.

Engine 220 is supplied with an air/fuel mixture with a supercharger or fluid pump 227. Supercharger 227 has a housing 228 rotatably supporting a drive shaft 229. A power transmission comprising a first sprocket 231 on shaft 229, a second sprocket 232 on shaft 222, and an endless roller link chain 233 coupling sprockets 231 and 232 provides a direct drive between engine 220 and supercharger 227. Sprockets 231 and 232 have the same diameters whereby the RPM of engine 220 is the substantially the same as the operating speed of supercharger 227. Sprockets 231 and 232 can have a sprocket ratio to provide desired air flow to a specific engine size. Supercharger 227 is a positive displacement fluid pump operable to deliver a supply of air/fuel mixture to engine 220 to increase its adiabatic efficiency and horsepower. The air/fuel mixture flows through a pipe or tubular member 234 connected to supercharger 227 and intake pipe 224 of engine 220.

An air/fuel mixing device 236, known as a carburetor, mounted on housing 228 operates to introduce fuel, such as gasoline and alcohol, into air flowing through device 236 to provide an air/fuel mixture for engine 220. A fuel line 237 connected to device 236 carries liquid fuel from a tank 235 to device 236.

An air/fuel mixture accumulator 238 is in fluid communication with pipe 234 to hold a supply of an air/fuel mixture between the engine intake strokes without excessive pressure rise. For example, for a single cylinder engine the volume of accumulator 238 is about twelve times the engine displacement. Accumulator 238 has a funnel or cone shape which allows a vehicle driven with engine 220 to accelerate and corner without pooling of fuel in accumulator 238. Accumulator 238 has the same structure as accumulator 38 shown in FIG. 9. The accumulator 238 is mounted on a check valve assembly, as shown in FIGS. 9 and 10, which directs the air/fuel mixture to the intake port of engine 220. Supercharger 227 may be employed in multi-cylinder engines of three cylinders or greater without the need for accumulator 238.

Figure 18:
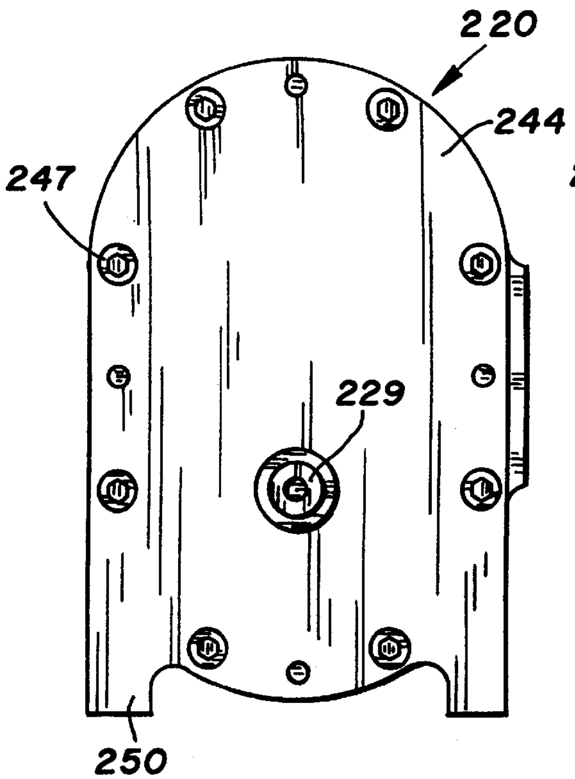
FIG. 18 is an end elevational view of the drive end of the supercharger of FIG. 16.
Figure 19:
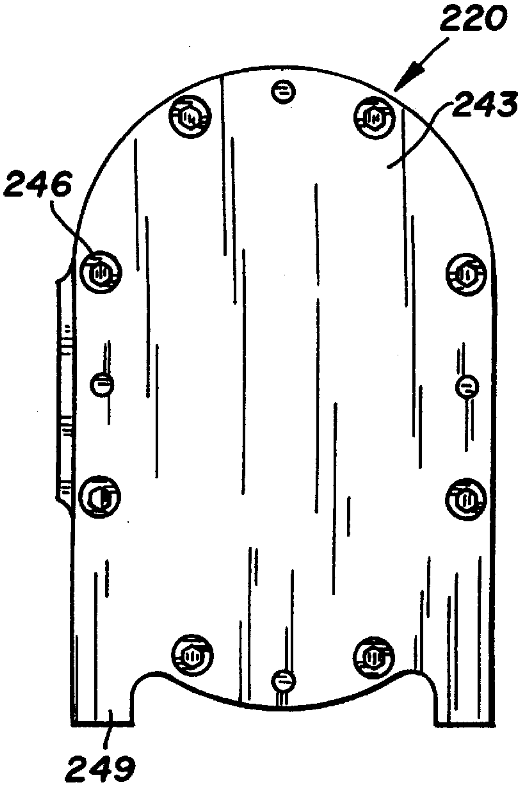
FIG. 19 is an end elevational view of the left end of the supercharger of FIG. 16.
Figure 20:
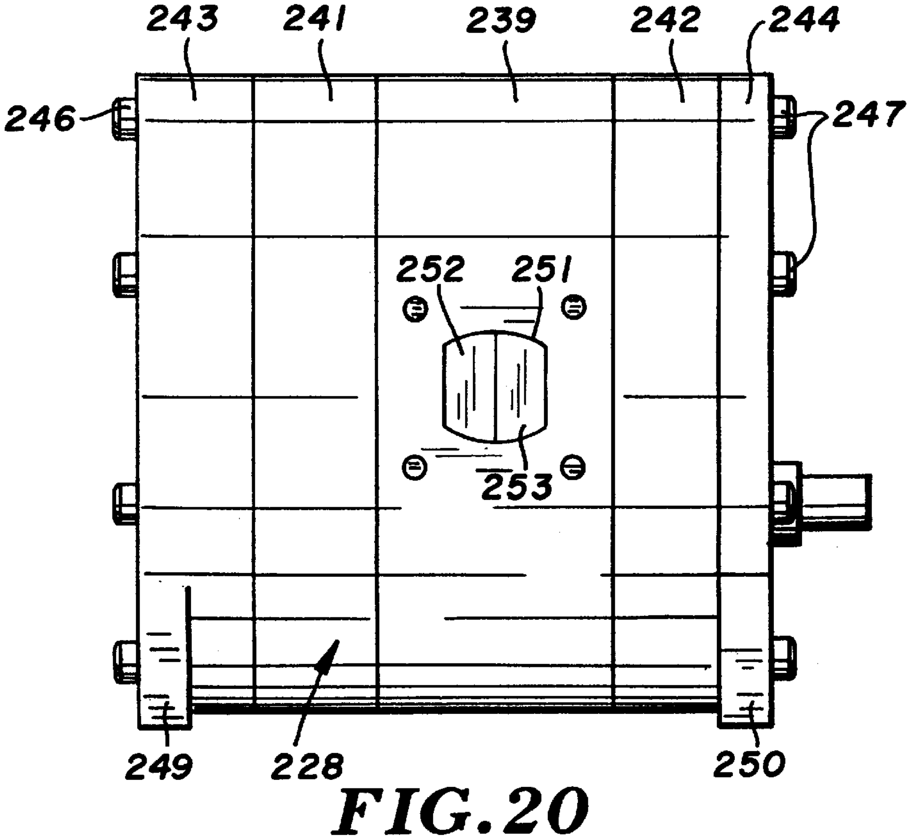
FIG. 20 is a front elevational view of the supercharger of FIG. 16.
Figure 21:
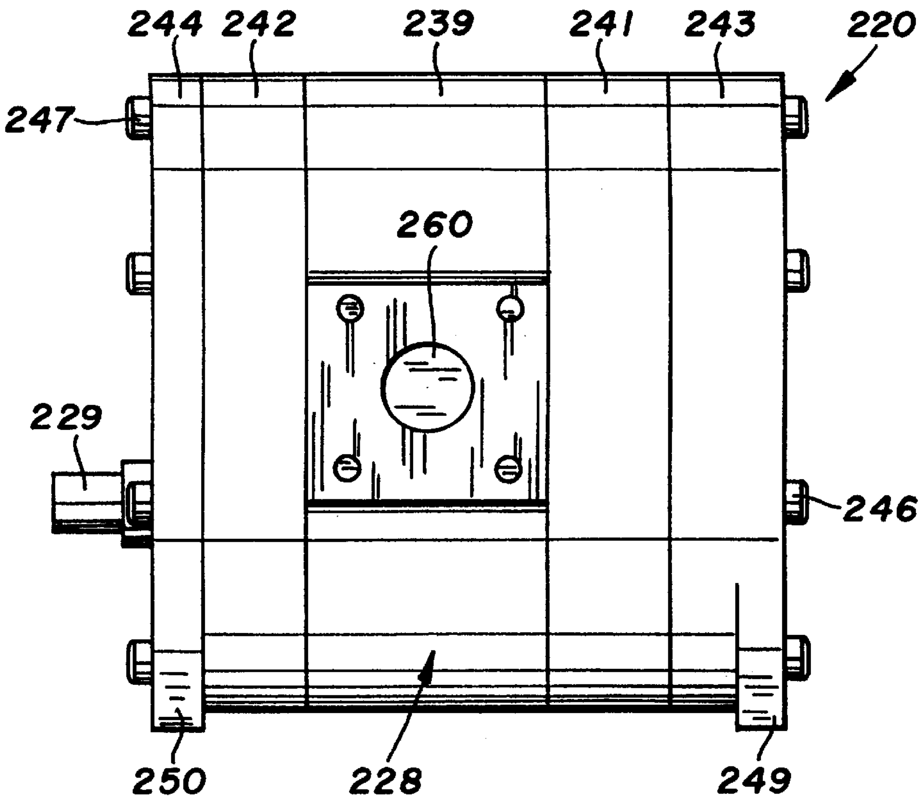
FIG. 21 is a rear elevational view of the supercharger of FIG. 16.
Figure 22:
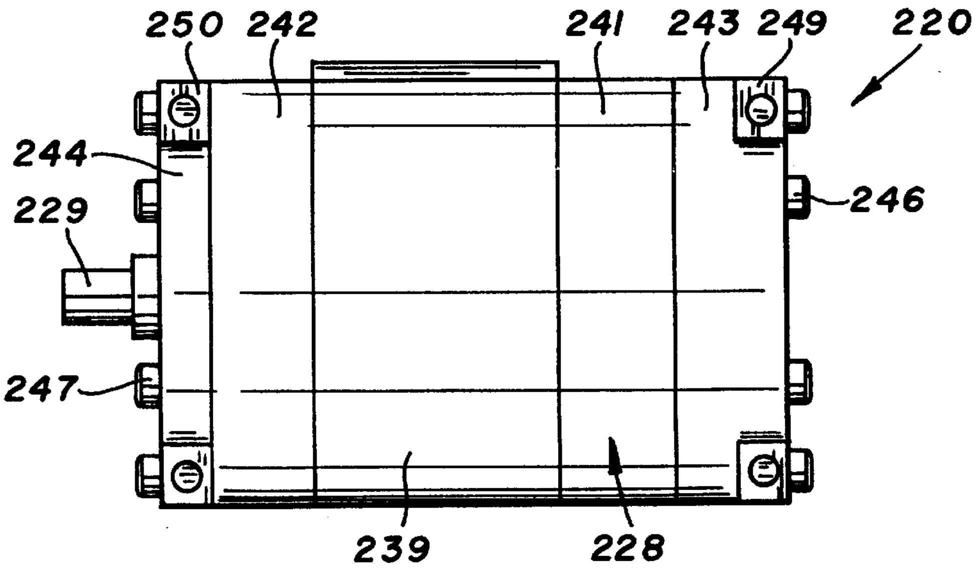
FIG. 22 is a bottom plan view of the supercharger of FIG. 16.

Supercharger housing 228, shown in FIGS. 16 to 22, has a central body 239 located between end members 241 and 242. A first cover plate 243 is located adjacent to the outside of end member 241. A plurality of bolts 246 attach end member 241 and cover plate 243 to body 239. A second cover plate 244 closes the outside of end member 242. A plurality of bolts 247 secure end member 242 and cover plate 244 to body 239. As shown in FIGS. 18, 19 and 22, end member 243 has a pair of downwardly directed legs 249. End members 244 has a pair of downwardly directed legs 250 laterally aligned with legs 249. Each leg 249, 250 has a threaded bottom hole for accommodating a bolt to secure housing 228 to a fixed support. Body 239 has a side passage 251 open to a pair of passages 252 and 253 to carry the air/fuel mixture from device 236 to the interior chamber of body 239.

Body 239 has a first arcuate inside wall 254 surrounding a first chamber 256 and a second arcuate inside wall 257 surrounding chamber 258. Passage 252 is open to chamber 256 to allow the air/fuel mixture to flow in a tangential direction into chamber 256. Passage 253 is open to chamber 258 so that the air/fuel mixture flows in a tangential direction into chamber 258. Walls 254 and 257 have cylindrical surfaces which are machined with conventional machine tools. Body 239 has a central portion 259 separating passages 252 and 253. Opposite portion 259 is an air/fuel discharge port 260 for carrying the air/fuel mixture from chambers 256 and 258 to pipe 234 leading to engine intake and accumulator 238.

Figure 24:
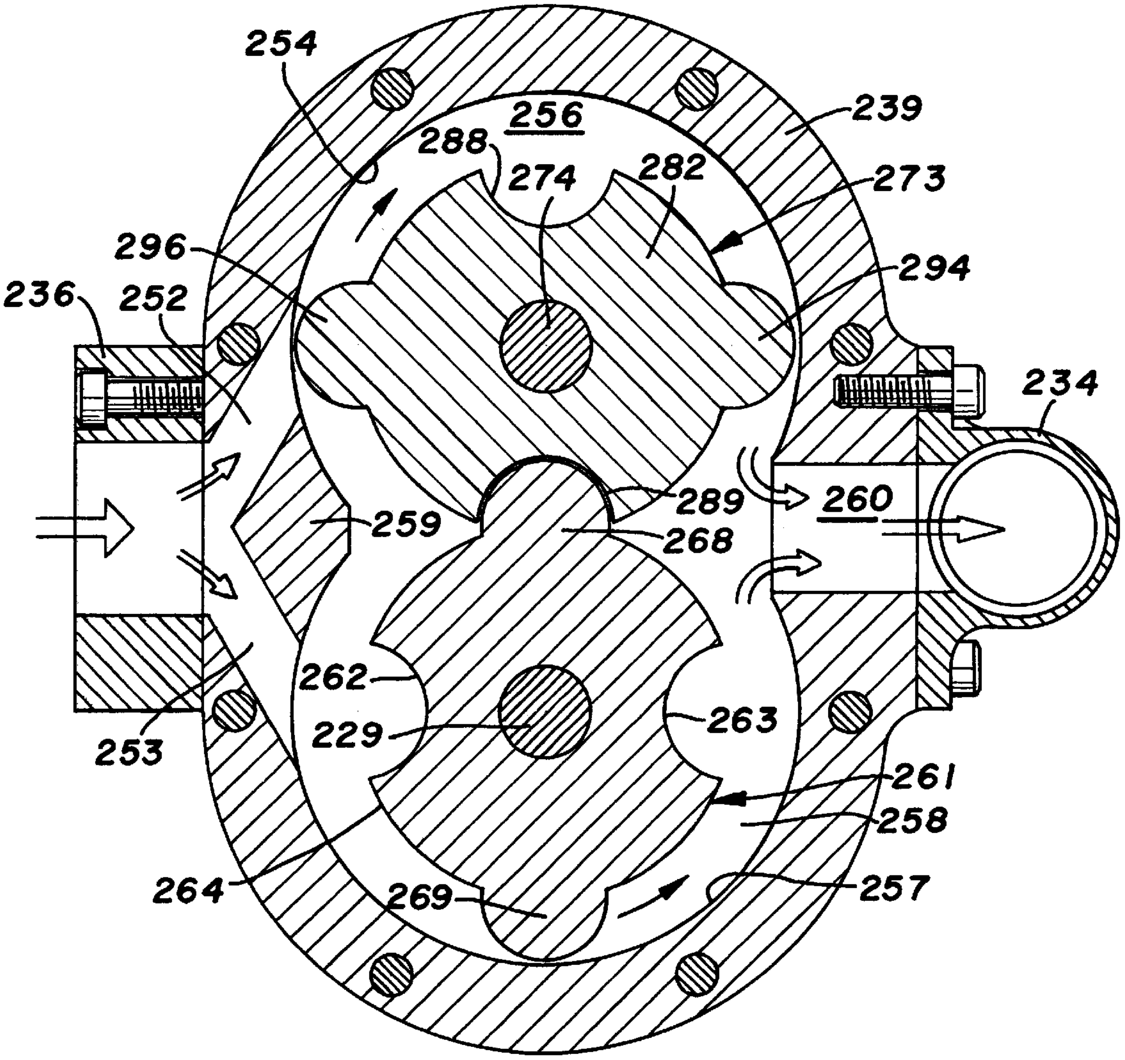
FIG. 24 is an enlarged sectional view taken along the line 24—24 of FIG. 17.

As shown in FIG. 24, a first rotor or rotating piston 261 mounted on shaft 229 is located in chamber 258. Rotor 261 has a pair of semi cylindrical pockets or recesses 262 and 263 open to its cylindrical outer surface 264. Body outer surface 257 is concentric with arcuate rotor surface 264. Surface 264 concentric with shaft 229 comprise segments of a cylinder pitch circle. Pockets 262 and 263 have semicircular cross sections and semi-cylindrical surfaces. Pockets 262 and 263 are located in opposite sides of rotor 261. Rotor 261 has a pair of protrusions 268 and 269. The number and locations of pockets and protrusions can vary to maintain dynamic balance of rotor 261. Each protrusion 268, 269 has a generally semi-cylindrical shape located 90 degrees or normal to pockets 262 and 263. Protrusions 268 and 269 project outwardly in opposite directions from surface 264 to dynamically balance rotor 261. The outer apex portions of protrusions 268 and 269 are located in close non-contacting relationship with body surface 257. There is a small space between protrusions 268 and 269 and surface 257 to prevent wear and friction between adjacent surfaces of the protrusions and body 239 and generation of heat and noise.

Figure 23:
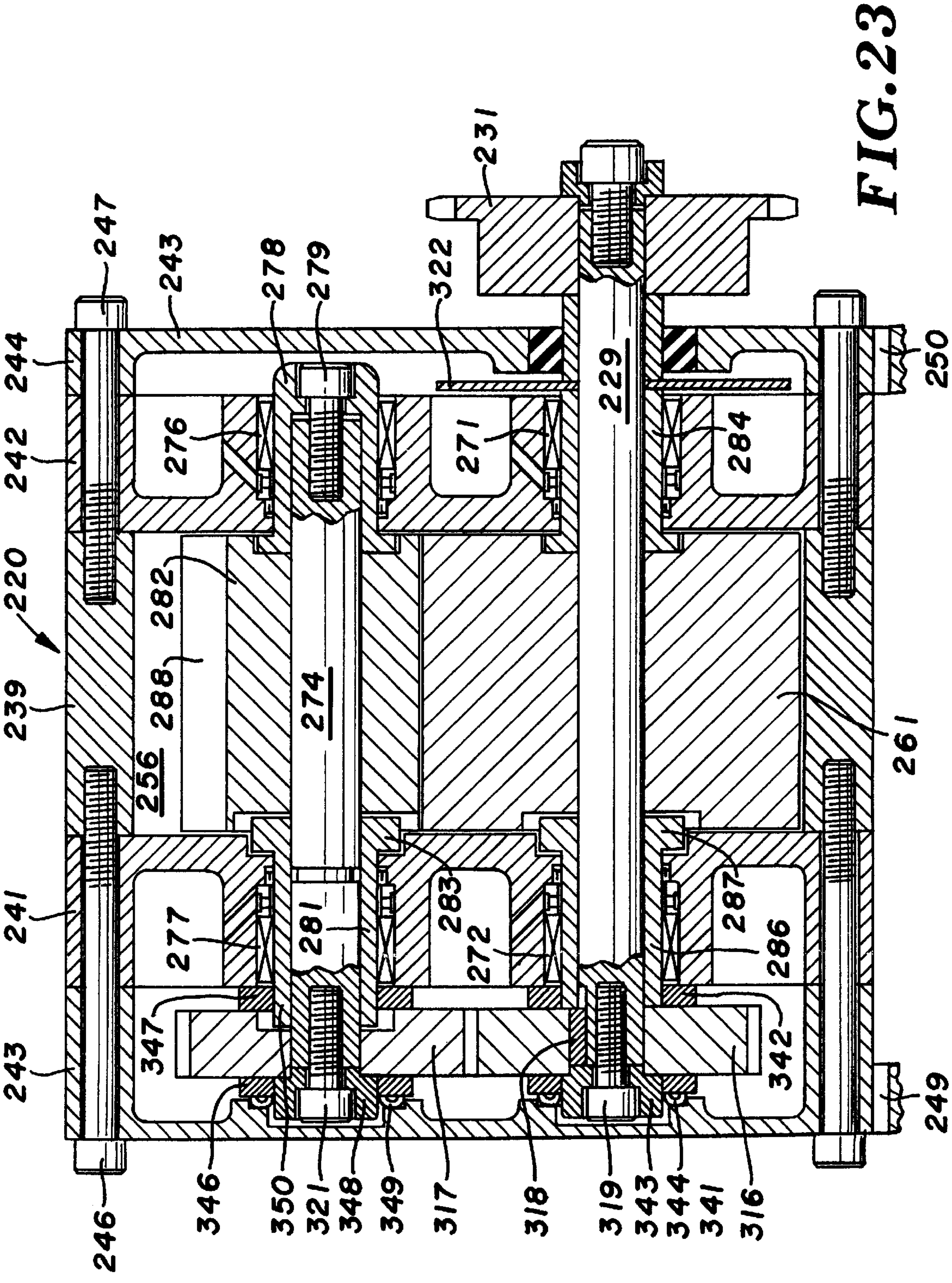
FIG. 23 is an enlarged sectional view taken along the line 23—23 of FIG. 17.

A second rotor or rotary piston 273 is mounted on a shaft 274. Opposite ends of shaft 274 are rotatably mounted on end members 241 and 242 with bearings 276 and 277, as seen in FIG. 23. A sleeve 278 secured to shaft 274 with a bolt 279 supports shaft 274 on bearing 276. A second sleeve 281 surrounding the opposite end of shaft 274 is keyed to rotor body 282 with a tongue and groove coupling 283. Sleeve 281 extends through bearing 277 whereby bearing 277 supports shaft 274 on end member 241.

Shaft 229 extends through sleeves 284 and 286 located adjacent opposite ends of body 261. Sleeve 284 extends through bearing 271 to support shaft 229 on end member 242. Sleeve 286 extends through bearing 272 to support shaft 229 on end member 241. A tongue and groove connection 287 drivably joins sleeve 286 to body 261 so that body 261 rotates with shaft 229.

Returning to FIG. 24, rotor body 282 has a pair of semi-cylindrical pockets 288 and 289 open to the outer cylindrical surface 291. Surface 291 is concentric with body surface 259. Surface 291 concentric with shaft 229 comprise segments of a cylinder pitch circle. The adjacent portions of surfaces 264 and 291 move in contiguous relationship as there is a small clearance between the adjacent surfaces. An example of this clearance is 0.005 to 0.007 inch. The rotor-to-rotor clearance reduces noise, wear of the rotors, and reduces heat generation. Pockets 288 and 289 are on opposite portions of body 282 and ninety degrees from a pair of protrusions 294 and 296. Each protrusion 294, 296 has a semi-cylindrical outer surface having the shape and configuration of pockets 262 and 263 of rotor 261. The outer apex portions of protrusions 294 and 296 are in close non-contacting relation with body surfaces 254. Protrusions 294 and 296 are integral portions of the monolithic rotor body 282. The rotors 261 and 273 and their protrusions 268, 269, 294 and 296 are one-piece structures. Rotors 261 and 273 are identical in size and shape. They can be made by an extrusion process and externally broached or shaved to finished size. Profile milling procedures can also be used to make the one-piece rotors 261 and 273. Large rotors can be hollow to reduce weight.

Figure 25:
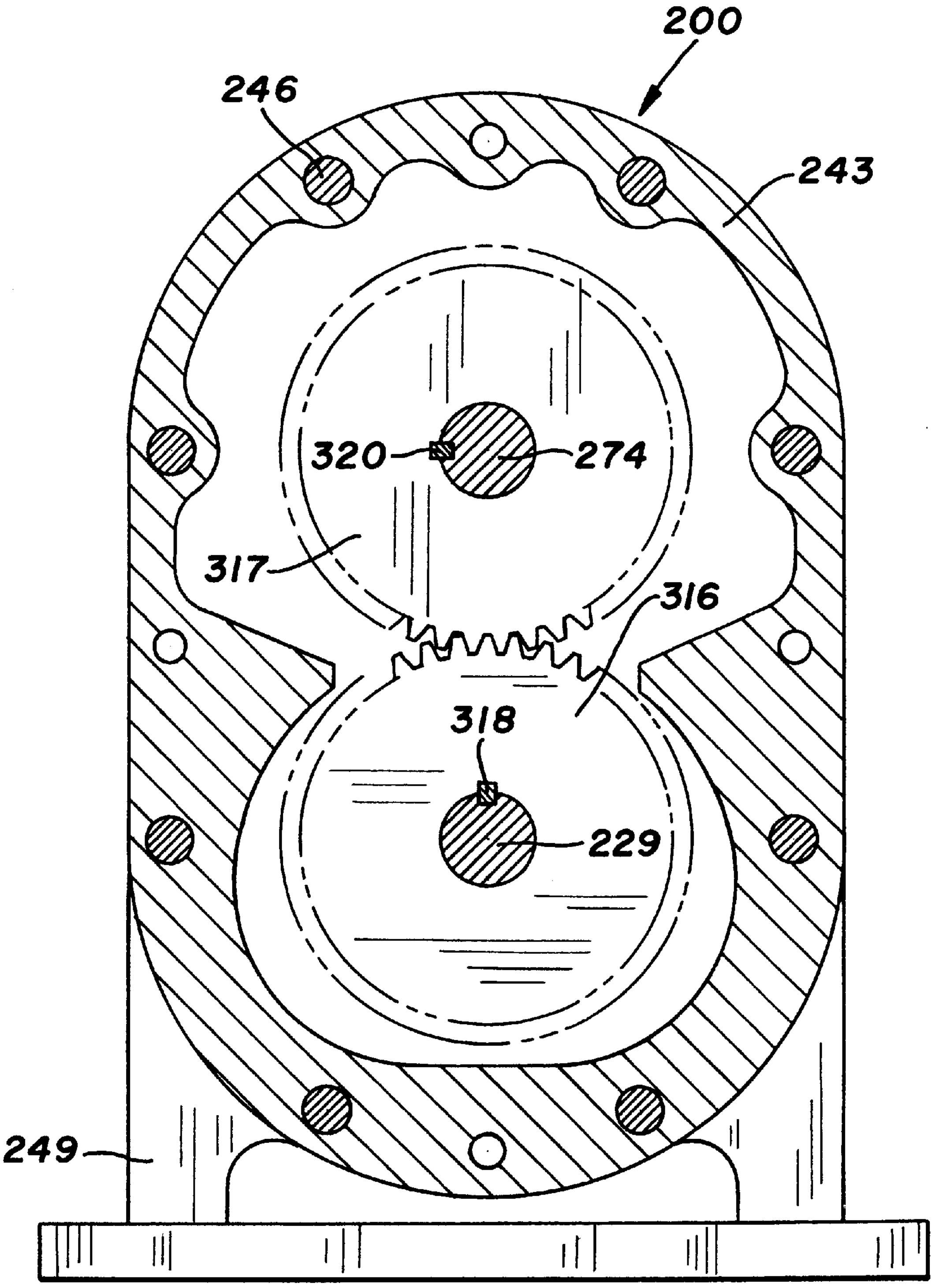
FIG. 25 is an enlarged sectional view taken along the line 25—25 of FIG. 17.

As shown in FIGS. 23 and 25, shafts 229 and 274 are drivably connected with spur gears 316 and 317 located within end cover 243. Gear 316 is fixed to shaft 229 with a key 318 and bolt 319. Gear 316 is located between thrust bearing washers 341 and 342. Washer 341 fits around an annular head 343 accommodating the head of bolt 219. Washer 342 surrounds sleeve 286. Washers 341 and 342 engage opposite sides of gear 316. An annular spring 344, such as a wave-type spring, located in a shallow recess in cover plate 243 engages washer 341 and biases the thrust bearing washers axially to retain washer 342 against end member 242. This locates the axial positions of the gear 316 and rotor 261. As shown in FIG. 23, the flat ends of rotor 261 are spaced a small distance from adjacent inside surfaces of end members 241 and 242. The small clearance between rotor 261 and end members 241 and 242 reduces wear, friction and heat generation during rotation of rotor 261. A bolt 321 secures gear 317 to shaft 274. A key 320 interconnects gear 317 with shaft 274 whereby gear 317 rotates shaft 274 and rotor 273. Bolt 321 retains gear 317 between thrust bearing washers 346 and 347. Washer 346 fits on a head 348 accommodating bolt 321. Washer 347 surrounds sleeve 281. A spring 349, such as an annular wave-like spring, located in a recess in cover plate 243 biases washer 346 to retain washer 347 against end member 242 to maintain the axial location of shaft 274, gear 317 and rotor 273. Rotor 273 has flat ends spaced a small distance from adjacent surfaces of end plates 241 and 242. The small clearance, seen in FIG. 23, between rotor body 282 and inside surfaces of end plates 241 and 242 reduces wear, friction and heat generation during rotation of rotor 273. Gears 316 and 317 have the same pitch diameters whereby shafts 229 and 274 rotate at the same speed. The pitch diameters of gears 316 and 317 are the same as the diameters of rotors 261 and 273. Rotors 261 and 273 turn in opposite directions at the same speed so that protrusions 268 and 269 register with pockets 288 and 289 in non-contact relation and protrusions 294 and 296 register with pockets 262 and 263 in non-contact relation during concurrent rotation of rotors 261 and 273. This reduces wear of the protrusions and rotor pockets and minimizes noise.

As shown in FIG. 23, cover plate 243 closes the open side of end member 242 and bearings 271 and 276. A flat disk 322 located between cover plate 243 and end member 241 is mounted on shaft 229. Disk 322 on rotation of shaft 229 moves a lubricant, such as oil, upward to lubricate bearings 271 and 276.

The present disclosure is preferred embodiments of the supercharger and accumulator for an internal combustion engine. It is understood that the supercharger and accumulator are not to be limited to the specific constructions and arrangements shown and described. It is understood that changes in parts, materials, arrangement and locations of structures may be made without departing from the invention.

What is claimed is:

1. An accumulator for accommodating an air/fluid mixture for an internal combustion engine comprising: a generally cone shaped side wall having a large upper end and small lower end, a top wall joined to the upper end of the side wall, said side wall and top wall surrounding an internal chamber for accommodating an air/fuel mixture, said lower end having an opening open to said chamber, a housing having an air/fuel mixture inlet port, an air/fuel mixture outlet port, an air/fuel mixture pressure relief port, and a first passage open to said ports for accommodating the air/fuel mixture, a sleeve mounted on the housing, said sleeve having a second passage open to the first passage and chamber whereby the air/fuel mixture flows through the first and second passages into and out of the chamber during operation of the internal combustion engine, means mounting the lower end of the side wall on the sleeve with the opening in communication with the second passage, a screen mounted on the sleeve and extended across the second passage, and check valve means located in the first passage to close the air/fluid mixture pressure relief port, said check valve means being operable to relieve excess pressure of air/fuel mixture in the first and second passages and chamber of the accumulator.

2. The accumulator of claim 1 wherein: said side wall is inclined downwardly and inwardly at an angle of about 40 degrees relative to the vertical axis of the accumulator.

3. The accumulator of claim 1 including: a tubular member joined to the lower end of the side wall, said tubular member being mounted on said sleeve.

4. The accumulator of claim 1 wherein: the top wall has an upwardly curved dome shape and an annular outer peripheral portion joined to the upper end of the side wall.

5. The accumulator of claim 1 wherein: the housing has an annular shoulder surrounding the passage between the inlet port and pressure relief port, said check valve includes a ball located in the passage in engagement with the annular shoulder to close the pressure relief port, and biasing means for holding the ball in engagement with the annular shoulder.

6. An accumulator for accommodating an air/fuel mixture for an internal combustion engine comprising: a generally cone shaped side wall having a large upper end and small lower end, a top wall joined to the upper end, said side wall and top wall surrounding a chamber for accommodating an air/fuel mixture for an internal combustion engine, a tubular member joined to the lower end of the side wall, a sleeve located within the tubular member, said sleeve having a passage open to the chamber to allow an air/fuel mixture to flow into and out of the chamber, and a screen mounted on the sleeve extended over the passage of the sleeve.

7. The accumulator of claim 6 wherein: said side wall is inclined downwardly and inwardly at an angle of about 40 degrees relative to the vertical axis of the accumulator.

8. The accumulator of claim 6 wherein: the top wall has an upwardly curved dome shape and an annular outer peripheral portion joined to the upper end of the side wall.

9. The accumulator of claim 6 including: a housing having an air/fuel mixture inlet port, an air/fuel mixture outlet port, an air/fuel mixture pressure relief port and a housing passage open to said ports for accommodating an air/fuel mixture, said sleeve being mounted on the housing with the sleeve passage in communication with the housing passage whereby the air/fuel mixture flows into and out of the chamber, and check valve means located in the housing passage to close the air/fuel mixture pressure relief port, said check valve means being movably located in the housing passage for movement between open and closed positions to relieve excess pressure of the air/fuel mixture in said passages and chamber.

10. The accumulator of claim 9 wherein: the housing has an annular shoulder surrounding the housing passage between the inlet port and pressure relief port, said check valve includes a ball located in the housing passage in engagement with the annular shoulder to close the pressure relief port, and biasing means for holding the ball in engagement with the annular shoulder.

11. An accumulator for accommodating an air/fuel mixture for an internal combustion engine comprising: a generally cone shaped side wall having a large upper end and a small lower end, a top wall joined to the upper end of the side wall, a tubular member joined to the lower end of the side wall, said tubular member having a first passage open to the chamber, a housing having an air/fuel mixture inlet port, an air/fuel mixture outlet port, and a second passage open to said ports, means mounting the tubular member on the housing with the first passage in communication with the second passage whereby the air/fuel mixture in the second passage flows into and out of the chamber, and a pressure relief valve located in the second passage operable to relieve excess pressure of the air/fuel mixture in said chamber and passages.

12. The accumulator of claim 11 including: a screen located in the first passage transversely across said first passage.

* * * * *